(12) United States Patent
Nair

(10) Patent No.: US 7,725,692 B2
(45) Date of Patent: May 25, 2010

(54) COMPACT REPRESENTATION OF INSTRUCTION EXECUTION PATH HISTORY

(75) Inventor: Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 11/743,457

(22) Filed: May 2, 2007

(65) Prior Publication Data

US 2008/0276081 A1 Nov. 6, 2008

(51) Int. Cl.
*G06F 7/38* (2006.01)
(52) U.S. Cl. .................................................. 712/227
(58) Field of Classification Search ...................... None
See application file for complete search history.

(56) References Cited

U.S. PATENT DOCUMENTS 6,877,090 B2 * 4/2005 Lee ............................. 712/239

* cited by examiner

*Primary Examiner*—Eddie P Chan
*Assistant Examiner*—John Lindlof
(74) *Attorney, Agent, or Firm*—Scully, Scott, Murphy & Presser, P.C.; Kenneth Corsello, Esq.

(57) ABSTRACT

A method of representing instruction execution path history is provided. The method in one aspect may include gathering information associated with a current instruction, the information including at least a target address. Previously computed bits representing execution path history is modified and hashed based on the target address, to compute current execution path history.

5 Claims, 1 Drawing Sheet

COMPACT REPRESENTATION OF INSTRUCTION EXECUTION PATH HISTORY

FIELD OF THE INVENTION

This disclosure relates in general to the improvement of performance of a computer system through the use of information about the control-flow path taken by recently executed code.

BACKGROUND OF THE INVENTION

Modern processors typically use branch predictors that predict the direction that a branch will take and the target address of the branch. A given branch instruction does not always go in the same direction for each execution of the instruction. Also, even when the direction is known, the target of a branch, e.g. an indirect branch, may change from one execution to another. Thus, it is customary to use some information about the path leading to the branch to make a more informed prediction of the direction and target of a branch.

Such information about the path leading to an instruction is also useful in other contexts. One example is in dynamic code optimization, where the nature of optimization can often be improved from the knowledge of the path taken to the block that needs to be optimized. Another example is in the prediction of "last-touch" of a shared object, where the path taken to an access of the object can often determine whether that object will be accessed again by the same processor or by a different processor.

A trivial way of identifying an instruction execution path is by identifying the addresses of all instructions and concatenating them together in the order of execution. However, such a representation is prohibitively long for a reasonable-sized sequence of instructions.

The instruction path can also be represented by a sequence of tuples, each tuple comprising the address of a basic block and the length of the basic block. This information is sufficient because, by definition, all instructions in a basic block must be executed in sequence once the basic block is entered. However this representation has a lot of redundant information because the address of a branch target can often be deciphered, especially in modern ISAs like the PowerPC ISA, from the bits in the branch instruction itself.

In a sequence of instructions that consists only of PC-relative branches where the starting address of the sequence is known, it is sufficient to simply record the direction taken by the branch, for example, a 1 for a taken branch, a 0 for a fall-through or not-taken branch. From the starting address, the path through the code can be completely determined by this sequence of 1's and 0's.

This sequence is not sufficient in the presence of indirect branches, where the address of the target of the branch is not available in the instruction itself; rather it is loaded into a register.

Thus there is a need for a mechanism to more accurately identify the path of instruction execution leading up to a branch or any other instruction whose behavior needs to be predicted and to do so using a compact representation.

BRIEF SUMMARY OF THE INVENTION

A method and a system for representing instruction execution path history are provided. The method in one aspect may comprise gathering information associated with a current instruction, the information including at least a target address, the target address being an instruction address to which control flows after the current instruction; assigning a 1-bit direction to the conditional branch if the current instruction is a conditional branch and if the conditional branch is determined to be taken; assigning a 1-bit direction if the current instruction is not a conditional branch; hashing the target address; shifting current content of a shift register having previously computed execution path history, left by one bit position and replacing rightmost bit of the shift register with the 1-bit direction, if the executing instruction is a conditional branch and the conditional branch is determined to be taken, or if the current instruction is not a conditional branch; shifting current content of the shift register left by number of bit positions equal to number of bits of the hashed target address and replacing rightmost bits with the hashed target address, if the current instruction is a conditional branch and the conditional branch is determined to be not taken; and compressing the current content of the shift register. A system comprising one or more means or devices for performing the above method is also provided.

Further features as well as the structure and operation of various embodiments are described in detail below with reference to the accompanying drawings. In the drawings, like reference numbers indicate identical or functionally similar elements.

DETAILED DESCRIPTION

Figure 1:
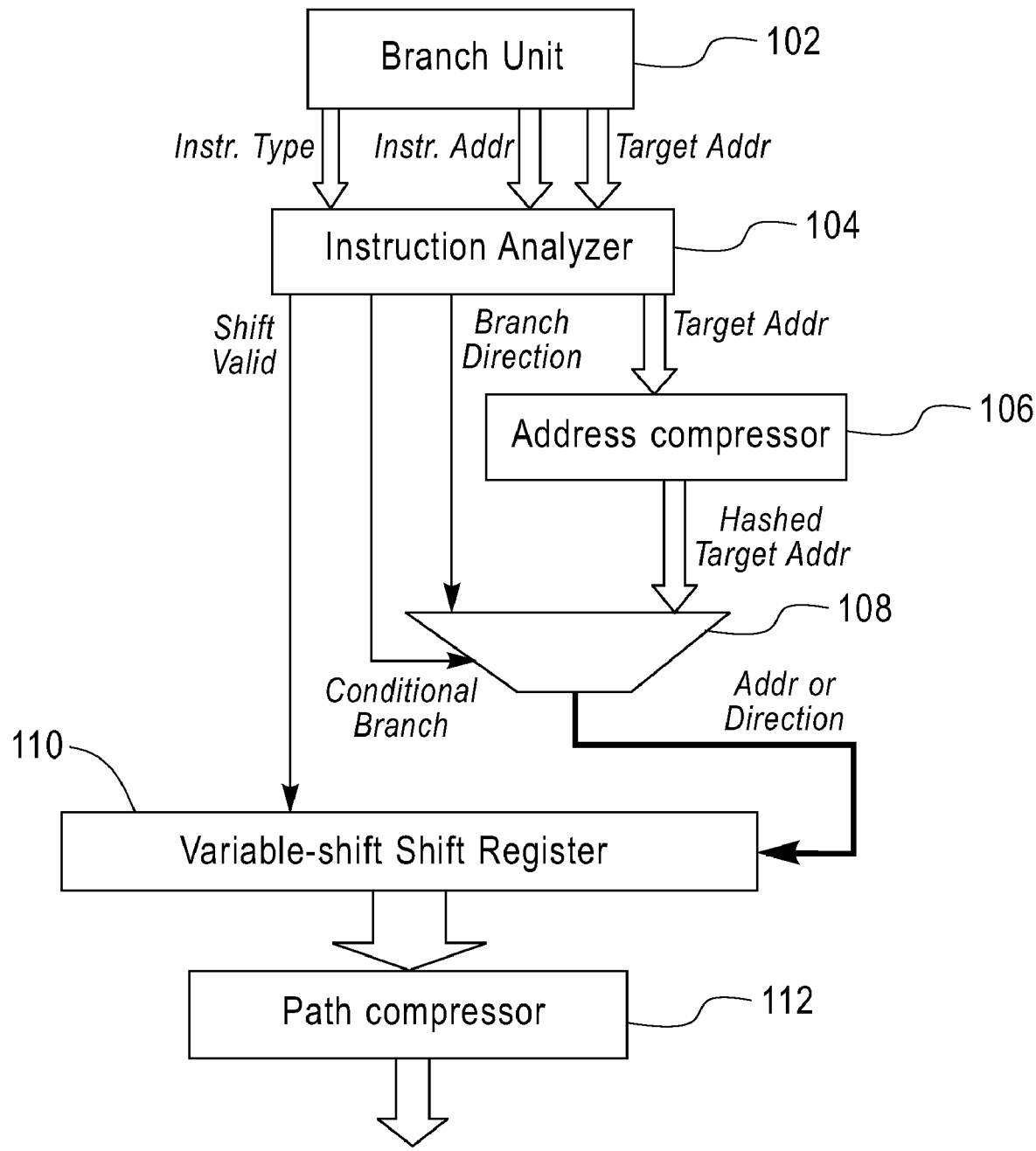
FIG. 1 illustrates a schematic diagram in an exemplary embodiment of the present disclosure.

The present disclosure describes a mechanism to represent and collect control-flow path taken by the code executing on a microprocessor. The sequence of 1's and 0's denoting the direction of conditional branches may be sufficient, if the only indirect branches during execution are subroutine returns and if the original instruction sequence allows the identification of the corresponding calls to the subroutine. In this case, a simple stack simulation will identify the target of the return and the address sequence can be completely reconstructed.

However, in other types of indirect branches and trap instructions, the representation of the instruction sequence must include the address of the target of such instructions. This disclosure refers to such instructions as register target (RT) instructions. In one embodiment, the RT set does not include subroutine return instructions. A method and system of the present disclosure in one embodiment propose here that the path be represented as a concatenation of the address of the targets of RT instructions, interspersed by the string representing the directions of the conditional relative branches in between.

A more compact though less accurate representation of this path history can be obtained by hashing the RT addresses down to a number of bits smaller than the full address width. One example of such a hashing is to take the lower order a+2 bits of the address and drop the last two bits to get an a-bit signature of the address. This scheme is ideal for an ISA, which represents every instruction in exactly 4 bytes.

An even more compact representation can be obtained by hashing the above sequence representation of length L down to a fixed number of bits, say b, for example by breaking the sequence into ceil (L/b) pieces each of length b, and performing an XOR of these pieces.

A practical implementation of this scheme may have a shift register of fixed length, for example, S, where a bit 1 or a bit 0 is shifted in from the right for each conditional relative branch, and a hashed address of length b is shifted in from the right for the indirect instructions mentioned above. Bits shifted out from the left are lost.

FIG. 1 illustrates a schematic diagram in an exemplary embodiment of the present disclosure. When a control flow instruction such as a branch executes in the Branch Unit 102 of the processor, information about the instruction is gathered. This information includes the type of instruction, typically the opcode field of the instruction. Also gathered is information about the address of the instruction and the target address, i.e. the instruction address to which control flows to after the current address. This packet of information is sent to the Instruction Analyzer 104 which determines whether the instruction will participate in the encoding of the path history and asserts the shift valid signal if it will participate. For instance, branch instructions may participate. The Instruction Analyzer 104 uses the instruction type information to determine if the instruction is a conditional branch and asserts the conditional branch signal accordingly. From the instruction address and the target address, the Instruction Analyzer 104 can also determine the direction of the branch, i.e. 'taken' or 'not taken'. For example, it is 'taken' if the target address is the address of the current instruction plus the length of the current instruction, and 'not taken' otherwise.

The Address Compressor 106 hashes the target address to a smaller number of bits, either by ignoring certain bits in the address, or by applying some function, e.g. XOR, on the bits of the address to generate a new set of a bits.

A multiplexor 108 selects either the 1-bit direction of the branch from 104 or the a-bit compressed target address from 106 depending on whether the control instruction is a conditional branch or not. In this embodiment, all indirect branches are assumed to be unconditional. The case when an indirect branch may be conditional is a simple extension to the scheme described here.

A register such as a Variable-shift Shift Register 108 stores instruction history computed from the previous instruction. The register may be empty, e.g., all zero bits, if the current instruction is the first one to execute, e.g., after a system startup. If the 1-bit direction is chosen by the multiplexor 108, the Variable-shift Shift Register 110 shifts left by one position, and the rightmost bit is replaced by the direction bit generated by 108. Otherwise, the Shift Register 110 is shifted left by a positions, and the rightmost a bits of the register are replaced by the a-bit compressed target address chosen by 108.

The Path Compressor 112, takes the L-bit contents of the Shift Register 110 and compresses it down to a smaller number of bits, b bits. The output of the Path Compressor is used as the representation of the path leading into the next control flow instruction that needs to be predicted.

While there may be a possibility of collision when using hashing, an appropriate choice of hashing functions can reduce the probability that two different paths produce the same representation There are many applications where the history information is needed only as guidance and need not be perfect—other checks can be made to verify the correctness as in branch prediction or code optimization applications. In such applications the rare collision implied by the disclosed scheme is acceptable.

TABLE 1

| Instruction Address | Control-Flow Instruction | Result | History Value | 4-bit Hashed Target | 12-bit History in Shift Register | 8-bit Hashed Path History |
|---|---|---|---|---|---|---|
| 1000B324 | Bc | | | | | |
| 100172A4 | | Taken | 1 | 1 | 010001001011 | 01001111 |
| 100172B8 | Bc | | | | | |
| 100172BC | | Not taken | 0 | 0 | 100010010110 | 10011110 |
| 100172E0 | B | | | | | |
| 10006280 | | Unconditional | | | | |
| 1000628C | bl | | | | | |
| 1001A224 | | Call | | | | |
| 1001A22C | bcctr | | | | | |
| 10024428 | | Register target | 10024428 | 1010 | 100101101010 | 01100011 |
| 1002443C | Bc | | | | | |
| 10024440 | | Not taken | 0 | | 001011010100 | 11010110 |
| 10024460 | Blr | | | | | |
| 10006824 | | Return | | | | |
| 10006834 | Bc | | | | | |
| 10006928 | | Taken | 1 | | 010110101001 | 10101100 |
| 1000694C | Bl | | | | | |
| 1001A224 | | Call | | | | |
| 1001A22C | bcctr | | | | | |
| 100240F0 | | Register target | 100240F0 | 1100 | 101010011100 | 10010110 |
| 1002410C | Bc | | | | | |
| 10024060 | | Taken | 1 | 1 | 010100111001 | 00111100 |
| 10024078 | Bc | | | | | |
| 1002407C | | Not taken | 0 | 0 | 101001110010 | 01111000 |
| 10024084 | Bc | | | | | |
| 100247C0 | | Taken | 1 | 1 | 010011100101 | 11100001 |

Table 1 shows an example using PowerPC instruction set. 32-bit target addresses were hashed to 4-bits by choosing the last 6 bits and dropping the 00 in the low order position. 12-bit history was hashed to 8 bits by XOR-ing top 4 bits with bottom 4 bits. Other hashing methodology may be used.

In the table, when the first instruction at hex address 1000B324 is presented to the Branch Unit 102, the instruction is analyzed, its type is determined to be BC (branch conditional). After the instruction executes in the Branch Unit, the target is determined to be hex address 100172A4. The Instruction Analyzer 104 takes this information, sets the Shift Valid signal because the instruction is one that will contribute to the history of the path, the Conditional Branch signal is set, the Direction is set to 1 (taken), and the Target Address is set to hex 100172A4. The Address Compressor 106 compresses the Target Address by first shifting right by 2 bits to give hex 4005CA9, and then using the low order 4 bits, i.e., binary 1001. At the multiplexor 108, the fact that the Conditional Branch signal has been set leads to selecting the single direction bit 1, rather than the compressed target address bits 1001. This then leads the original contents of the Shift Register 110 to be shifted left by 1 bit, i.e. the binary value 001000100101 becomes 010001001010 and the multiplexed bit 1 replaces the last bit, leading to the new contents of 010001001011. The Path Compressor 112, folds the 12-bit value to 8 bits by XOR the high 4 bits 0100 with the low 8 bits 01001011 to give 01001111. Other method of compression may be utilized.

At the hex address 1001A22C, the multiplexor 108 chooses the 4 bits of the target address 1010 rather than the direction bit, because the instruction type is a bcctr, not a conditional branch of the bc type. Thus at the Shift Register 110, the value 100010010110 gets shifted by 4 bits to 100101100000 and the multiplexed bits 1010 replace the low order 4 bits leading to a history register value of 100101101010, and a folded value of 01100011.

The system and method of the present disclosure may be implemented and run on a general-purpose computer or computer system, and may utilize logic/hardware resources. The computer system may be any type of known or will be known systems and may typically include a processor, memory device, registers, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A method for representing instruction execution path history, comprising: gathering information associated with a current instruction, the information including at least a target address, the target address being an instruction address to which control flows after the current instruction; assigning a 1-bit direction to a conditional branch if the current instruction is a conditional branch and if the conditional branch is determined to be taken; assigning a 1-bit direction if the current instruction is not a conditional branch; hashing the target address by shifting the target address to the right by a predetermined number of bits and selecting a predetermined number of low order bits to represent a hashed target address; shifting current content of a shift register having previously computed execution path history, left by one bit position and replacing rightmost bit of the shift register with the 1-bit direction, if the executing instruction is a conditional branch and the conditional branch is determined to be taken, or if the current instruction is not a conditional branch; shifting current content of the shift register left by number of bit positions equal to number of bits of the hashed target address and replacing rightmost bits with the hashed target address, if the current instruction is a conditional branch and the conditional branch is determined to be not taken; and compressing the current content of the shift register.

2. The method of claim 1, wherein the information associated with an executed instruction includes an opcode field of the executing instruction.

3. The method of claim 1, wherein the step of compressing includes:
using an XOR function to fold the current content of the shift register into smaller number of bits.

4. The method of claim 1, further including:
using the compressed content of the shift register as a path leading into a next control flow instruction.

5. A system for representing instruction execution path history, comprising: means for gathering information associated with a current instruction, the information including at least a target address, the target address being an instruction address to which control flows after the current instruction; means for assigning a 1-bit direction to a conditional branch if the current instruction is a conditional branch and if the conditional branch is determined to be taken; means for assigning a 1-bit direction if the current instruction is not a conditional branch; means for hashing the target address by shifting the target address to the right by a predetermined number of bits and selecting a predetermined number of low order bits to represent a hashed target address; means for shifting current content of a shift register having previously computed execution path history, left by one bit position and replacing rightmost bit of the shift register with the 1-bit direction, if the executing instruction is a conditional branch and the conditional branch is determined to be taken, or if the current instruction is not a conditional branch; means for shifting current content of the shift register left by number of bit positions equal to number of bits of the hashed target address and replacing rightmost bits with the hashed target address, if the current instruction is a conditional branch and the conditional branch is determined to be not taken; and means for compressing the current content of the shift register.

* * * * *